Jan. 22, 1952  D. J. REYNOLDS  2,583,158
SUBSYNCHRONOUS INTERMITTENT-VOLTAGE APPARATUS
Filed June 30, 1949
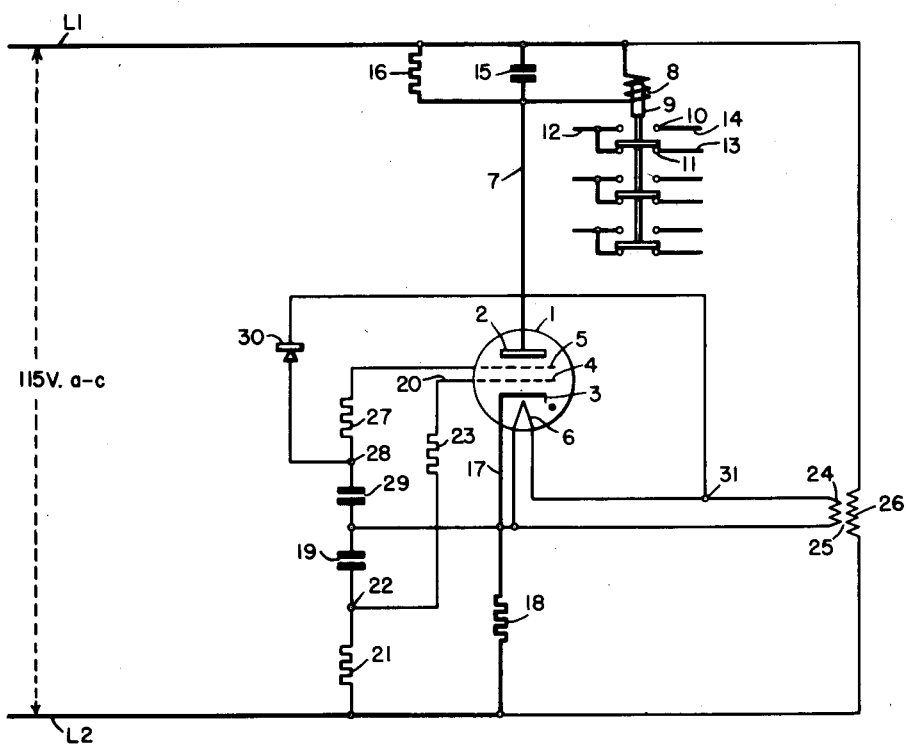
WITNESSES:
Edward Michaels
Wm. C. Groome
INVENTOR
Delos J. Reynolds.
BY O.B.Buchanan
ATTORNEY Patented Jan. 22, 1952

2,583,158

UNITED STATES PATENT OFFICE 2,583,158

SUBSYNCHRONOUS INTERMITTENT-VOLTAGE APPARATUS

Delos J. Reynolds, Chicago, Ill., assignor to Westinghouse Electric Corporation, East Pittsburgh, Pa., a corporation of Pennsylvania Application June 30, 1949, Serial No. 102,236

1 Claim. (Cl. 315—355)

My invention relates to an electron-tube circuit for deriving, from a single-phase supply-circuit, a succession of intermittent voltage-impulses which become effective during non-successive cycles of the supply-circuit. More specifically, my invention relates to apparatus of the type just mentioned, in which the succession of intermittent voltage-impulses are suitable for energizing a vibrator or vibrating contact-mechanism which vibrates subsynchronously with respect to the single-phase supply-circuit.

While my invention is not limited to any particular use or application, it was primarily designed to provide a subsynchronous vibrator which would replace a much more cumbersome and expensive rotating commutator-switch which has been driven by a synchronous motor, in a testing apparatus such as the testing-apparatus shown in the Rohats Patent 2,321,424, granted June 8, 1943, or in the testing-apparatus shown in Harter application Serial No. 708,398, filed November 7, 1946, now Patent No. 2,569,990, or in the testing-apparatus shown in a Johnson application Serial No. 708,393, filed November 7, 1946, patented October 10, 1950, No. 2,525,413, these two applications being assigned to the Westinghouse Electric Corporation. The testing-apparatus, in each case, is an apparatus for testing the winding-insulation in high-voltage generators, and in each case the testing-apparatus has involved the use of switching-devices for alternately connecting either one of two different circuits in the testing equipment, so that the voltages of two different portions of the generator-winding could be compared, one against the other.

The object of my invention is to provide a subsynchronous intermittent-voltage electronic apparatus, comprising an electron-tube which, after once discharging, will automatically block itself against discharging again, for a certain predetermined time-interval, thereby producing a succession of discharges at a subsynchronous rate which is slower than the frequency of the supply-circuit.

With the foregoing and other objects in view, my invention consists in the circuits, apparatus, combinations, parts, and methods of design and operation, hereinafter described and claimed, and illustrated in the accompanying drawing, the single figure of which is a diagrammatic view of circuits and apparatus illustrating my invention in a preferred form of embodiment.

In the drawing, I show a gas discharge-tube 1 which is intended to be broadly representative of any controlled electronic device of a sustained-discharge type. Essentially, the tube 1 is provided with a plate or anode 2, a cathode 3, and a control-grid 4 or equivalent control-circuit means. The particular tube which is chosen for illustration is also provided with a screen-grid 5, although this feature is not necessary. The particular tube which is illustrated is also provided with a separate heater 6, for heating the cathode 3, although this feature, also, is not obligatory, as will be well understood. The tube 1 has the so-called sustained discharge characteristic whereby its plate-cathode circuit will remain non-conductive until its grid-voltage becomes sufficiently positive with respect to its cathode at a time when an adequate positive voltage is being applied to the plate, said plate-cathode circuit thereupon firing and maintaining its firing condition until the plate is no longer sufficiently positive with respect to the cathode, this firing condition being maintained regardless of the subsequent voltage of the grid, once the tube is firing.

The plate-cathode circuit of the tube 1 is energized from a single-phase supply-circuit having leads L1 and L2, which may represent a 115 volt, 60 cycle circuit. In the illustrated form of embodiment of the invention, the plate-circuit 7 of the tube is connected to the supply-lead L1 through a load-device, which is illustrated in the form of an operating-coil 8 of a vibrator or vibrating switching-device 9 having one or more sets of make-contacts 10 and break-contacts 11, whereby a relaying-circuit 12 can be diverted first to a branch-circuit 13, through the back-contact 11, and then to the branch-circuit 14, through the make-contact 10.

Because of the highly inductive nature of the operating coil 8 of the vibrator, it is advantageous, as shown, to shunt this coil with a capacitor 15, which absorbs the first energy-flow through the plate-circuit 7 when the tube 1 first fires, at a time when the inductance of the coil 8 prevents an instantaneous current-flow through the coil, so that the capacitor 15 can temporarily store the plate-circuit energy and give it back again to the coil 8, thus increasing the effectiveness of the apparatus. A resistor 16, in parallel with the coil 8 and the capacitor 15, is also advantageous for damping out any continuing oscillation in the circuit 8—15, and thus substantially increasing the mechanical power obtained in the vibrator 9.

In the broader aspects of my invention, however, it will be understood that I am not limited to the use of a vibrator-coil 8 as the load-device which is to be supplied with a succession of intermittent voltage-impulses responding to the successive firing and non-firing periods of the tube 1.

In the illustrated form of embodiment of my invention, the cathode-circuit 17 of the tube is connected to the supply-lead L2 through a cathode-circuit resistor 18, which is used as a convenient source of tube-controlling voltage which is responsive to the firing period of the tube, although I am not necessarily limited to the use of a cathode-circuit resistor as my means for obtaining a suitable tube-controlling voltage.

It is a characteristic feature of my invention that I provide a grid-circuit capacitor 19, which is connected between the cathode-circuit 17 and the grid-circuit 20 of the control-grid 4. In accordance with my invention, the grid-circuit capacitor 19 is given a blocking-charge during the firing-period of the tube 4, so that the plate of the condenser which is connected to the grid-circuit 20 will become negatively charged at a potential which is high enough to block the re-firing of the tube, as long as that negative charge persists. The particular means which I show for applying a charging-voltage to the grid-circuit capacitor 19, in response to the firing-operation of the tube, is the cathode-circuit resistor 18, although any means which supplies a suitable source of voltage during the firing of the tube could be used for charging this grid-circuit capacitor 19. In the illustrated form of embodiment of the invention, the voltage-drop across the cathode-circuit resistor 18 is applied to the grid-circuit capacitor 19 through a discharging resistor 21, which is connected between the supply-lead L2 and the capacitor-terminal 22 which is to be given a negative charge with respect to the cathode-circuit 17. The grid-circuit 20 also contains the usual current-limiting resistor 23.

The heater 6 of the tube 1 is energized at a low voltage, such as 6 volts, from any suitable source which is illustrated as the secondary winding 24 of an auxiliary transformer 25, having a primary winding 26 which is energized across the main supply-leads L1 and L2.

In the particular form of my invention which is shown in the drawing, the screen-grid 5 is either held at the cathode-potential, or it is given a small negative potential with respect to the cathode. As illustrated, the screen-grid 5 is given a small negative potential, by being connected, through the usual current-limiting resistor 27, to the negative terminal 28 of a capacitor 29, the other terminal of which is connected to the cathode-circuit 17. The capacitor 29 is kept charged, with a small negative potential on its terminal 28, by means of a rectifier 30, which is connected between the terminal 28 and the heating transformer secondary-terminal 31 which is not connected to the cathode-lead 17.

In operation, let us assume that the tube 1 is discharging during the supply-circuit half-cycle during which the supply-lead L1 is positive and the supply-lead L2 is negative. During this discharge or firing-period of the tube, its plate-cathode circuit 7—17 is carrying current, thus energizing the vibrator-coil 8 (or other load-device), and also producing a certain voltage-drop across the cathode-circuit resistor 18. By proper choice of this resistance, the exact magnitude of this voltage-drop can be controlled. Let us assume, by way of illustration, that this cathode-circuit voltage-drop is of the order of 10 volts.

This cathode-circuit voltage-drop, of the order of 10 volts, is being applied to the grid-circuit capacitor 19, through its discharging-resistor 21, throughout all of the time during which the tube 1 is firing or carrying current in its plate-cathode circuit 7—17, and hence a stronger and stronger negative charge is being built up on the terminal 22 of this grid-circuit capacitor 19 during this time. Because of the sustained-discharge character of the tube 1, the control-grid 4 has no power to interrupt the tube-discharge, once that discharge has been started, and hence the tube will continue to fire until the end, or very nearly the end, of the supply-circuit half-cycle during which it was firing. This is true, because the tube 1 obviously cannot carry current while the supply-lead L1 is negative with respect to the supply-lead L2.

By the time when the firing of the tube 1 has been interrupted at or near the end of the positive supply-circuit half-cycle during which it had been firing, as just described, the grid-circuit capacitor 19 will have built up a charge, so that its grid-connected terminal 22 is at a predetermined negative voltage with respect to the cathode-circuit 17. This negative voltage will be a certain portion of the voltage-drop across the cathode-circuit resistor 18. The magnitude of the cathode-circuit voltage-drop across the resistor 18 can be adjusted by the proper selection of the resistance 18, and the portion of this cathode-circuit voltage-drop which is built up on the grid-circuit capacitor 19 can be controlled by controlling the charging-rate, through a proper selection of the resistance 21. Thus, if the cathode-circuit voltage-drop is of the order of 10 volts, the maximum negative charge which is built up on the grid-circuit capacitor 19 may be almost any part of this, say, from 2 to 5 volts, more or less, by way of giving a concrete example.

As soon as the tube 1 stops firing, the grid-circuit capacitor 19 starts to discharge, according to an exponential curve which is dependent upon the combined resistances of the shunt-connected discharge-circuit including the discharging resistor 21 and the cathode-circuit resistor 18. Since the dwindling charge on the capacitor 19 is smaller than the potential-difference which was effective to increase the negative charge on the capacitor during the firing operation of the tube, the rate of discharge will be smaller than the rate of charge.

For example, if the negative charge on the capacitor 19 were, say 0.5 volt, at the moment when the tube 1 began to fire, and if the maximum negative charge on the capacitor, which is attained at the end of the firing-operation of the tube, were $x$ volts, and if the cathode-circuit voltage-drop, in the resistor 18, were $y$ volts, during the firing of the tube, then the effective charging-voltage which is operative to increase the negative charge on the capacitor 19 during the firing of the tube would be $(y-0.5)$ volts, at the beginning of the charging of the capacitor, and it would be reduced to $(y-x)$ volts at the end of the charging of the capacitor 19. While the capacitor 19 is discharging, however, the discharging-voltage varies between $x$ volts and 0.5 volt. It will be obvious that the time required to discharge a certain charge from the capacitor 19 will necessarily be longer than the time required to impart that same charge to the capacitor, and by properly choosing the values of the two resistances 18 and 21, it is obviously possible to control the values $x$ and $y$, while the value of the negative grid-voltage, which we have assumed to be 0.5, at which the tube is free to fire, (when its anode becomes sufficiently positive), can obviously be controlled by choosing a tube having the desired constants, or by introducing a suitable constant C-battery biasing-voltage (not shown) in the grid-circuit of the tube.

By the means just described, it is possible to design the constants so that, after a positive supply-circuit half-cycle during which the tube 1 is firing, it will not fire during the next following positive half-cycle, or the next two or more positive half-cycles, of the supply-circuit voltage, thus causing the tube 1 to fire only on the second, third, or fourth, etc., positive half-cycles of the supply-current voltage. For example, if the tube 1 skips only one positive half-cycle after a firing-period, before it again fires, vibrator-coil 8 (or other load-circuit) will receive an energizing-impulse only once for each two complete cycles of the supply-circuit voltage, so that the vibrator 9, under such conditions, would have a 30-cycle vibration-rate, when the supply-circuit frequency is 60 cycles, for example. It will be obvious that, whatever the desired vibration-rate of vibrator 9 may be, the ratio of mass to force should preferably be chosen to give the vibrator a natural frequency of approximately the same rate, thus, greatly reducing the amount of energy required.

The make- and break-contacts 10 and 11 of the vibrator 9 may be so chosen as to make the contact-making and contact-interrupting times or periods have any desired relative values, within the obvious design-limits of the switching-element.

As a result of the operation of my invention, as just described, it will be noted that I have provided two or more circuits or places at which a succession of subsynchronous voltage-impulses are obtained from an alternating-current supply-line L1—L2. Thus, the supply-line L1 and the anode-lead 7 may be considered as the two output-terminals of my device, thus producing an output-voltage impulse, between these two terminals, every time the tube 1 fires. On the other hand, if a suitable voltage-source (not shown) is applied to the relaying-circuit 12 of the vibrator 9, either the terminal 13 or the terminal 14 may be regarded as a place having therein a succession of intermittent voltage-impulses which are responsive to the successive firing and nonfiring periods of the tube 1.

Advantages of my invention include its small cost, the small space which it occupies, its ability to maintain a predetermined phase-position and a predetermined polarity with respect to the phase and the polarity of the supply-circuit voltage, and a substantial freedom from maintenance-difficulties.

While I have illustrated my invention in only one specific concrete form, with several suggestions as to its variables and limits, I wish it to be understood that I am not limited to the described and illustrated details. I desire, therefore, that the appended claim shall be accorded the broadest construction consistent with its language.

I claim as my invention:

A subsynchronous intermittent-voltage apparatus adapted to provide a succession of intermittent voltage-impulses which become effective during non-successive cycles of a single-phase supply-circuit, comprising: a controlled electronic device of a sustained-discharge type, said electronic device comprising a plate-cathode circuit and a control-circuit, said plate-cathode circuit remaining non-conductive until a predetermined firing-voltage condition is obtained in the control-circuit at a time when an adequate positive voltage is applied to the plate, said plate-cathode circuit thereupon firing and maintaining its firing condition until its plate is no longer sufficiently positive with respect to its cathode; circuit-means adapted to energize said plate-cathode circuit from the single-phase supply-circuit; a control-circuit capacitor in the control-circuit; means for providing a discharge-circuit in shunt-circuit relation to said control-circuit capacitor; means responsive to a firing condition of said plate-cathode circuit for building up a blocking charge on said control-circuit capacitor, whereby the control-circuit, after the cessation of that firing-period of the electronic device, will not subsequently reach a firing-voltage condition until said control-circuit capacitor has discharged to a predetermined amount, the discharging time of said discharge-circuit being long enough to prevent firing of said electronic device during a required number of supply-circuit cycles; and means responsive to the successive firing and non-firing periods of said electronic device for deriving therefrom the required succession of intermittent voltage-impulses.

DELOS J. REYNOLDS.

REFERENCES CITED

The following references are of record in the file of this patent:

UNITED STATES PATENTS

| Number | Name | Date |
|---|---|---|
| 1,926,181 | Schramm | Sept. 12, 1933 |